Patented Mar. 9, 1937

2,073,301

UNITED STATES PATENT OFFICE 2,073,301

WATERPROOFING

Samuel D. Gehman, Akron, Ohio, assignor to Wingfoot Corporation, Wilmington, Del., a corporation of Delaware No Drawing. Application July 21, 1934, Serial No. 736,372

6 Claims. (Cl. 91—70)

This invention relates to the water-proofing of regenerated cellulose and like materials which swell when placed in contact with water. The invention includes both the process of waterproofing and the water-proofed product. The invention relates more particularly to the water-proofing of a sheet of regenerated cellulose by first treating it with a water-resistant priming coat and then applying a moisture proof coat such as a covering which contains a rubber derivative or cellulosic compound such as nitro cellulose, or other compositions known in the art.

It has been found that sheets of regenerated cellulose, such as those sold as Cellophane, may be moisture-proofed by coating with rubber derivatives, or as has been previously known, by pyroxylin lacquers, etc. These coatings are resistant to water vapor, and a Cellophane sheet coated with such a moisture-proofing compound or composition is very resistant to the transmission of water vapor. When tightly sealed over a crystallizing dish containing water and placed in a drying oven containing sulphuric acid which keeps the air in the oven extremely dry, it has been found that very little water is transmitted through such sheets in vapor form. However, when the sheets are dipped in water or otherwise brought into contact with water for several hours, the Cellophane is swelled and the coating separates from the Cellophane.

According to this invention such a separation is prevented or delayed for weeks or months by providing a priming coating which provides an improved water anchorage for the moisture-proof coating when brought into contact with water. One or both sides of the Cellophane sheet may be treated with the priming composition and then the water-proofing composition, and when so treated the Cellophane is both moisture-proof and water-resistant. If but one side of the sheet is so treated this side may be brought in contact with water, or if both sides of the Cellophane are so treated the sheet may be dipped in water and even after several weeks or months the coating and the Cellophane base remain intact, and the sheet after removal from the water is moisture resistant, and is serviceable as a moisture-proof wrapping material.

The priming compositions of this invention include the vegetable oils, such as linseed oil and China-wood oil. They are advantageously applied to the Cellophane base as a water emulsion, or in solution in some solvent which wets the Cellophane. A very thin coating of the priming composition will give good adhesion. Moisture-proof coatings even when in contact with water, adhere strongly to such priming compositions.

According to a preferred method of moisture-proofing and water-proofing, Cellophane film is dipped in a solution of one-fourth of one per cent of China-wood oil in a petroleum distillate. This is allowed to drain and then dried, as by heating for one minute at 250° F. or for a longer period at a lower temperature. The coated film thus obtained is then dipped in a 3% solution in a low boiling petroleum distillate of the chlorine-containing rubber derivative prepared by the chlorostannic acid reaction more particularly described below. After dipping in this solution the film is dried ½ minute at 195 degrees F. or in any suitable way.

The priming coat may be applied as an emulsion. For example, $\frac{1}{10}$ of 1% of China-wood oil may be emulsified with water using a high speed stirrer. Water is advantageously added to this emulsion to reduce the concentration of the oil to 1/20 to 1/50 of 1%. The regenerated cellulose in sheet, or other, form may be dipped in this, then dried at an elevated temperature until the oil has dried, and then dipped in a moisture-proofing dope such as a nitrocellulose or rubber derivative lacquer. If desired the oil or other emulsion may be added to the last washing bath used in the manufacture of the Cellophane, and it may thus be applied without any additional processing or labor.

Plasticizers etc. may be added to the drying oils used in preparing the priming composition, and may likewise be incorporated in the moisture-proof coating. For example, a satisfactory film was prepared by dipping a Cellophane film in a ¼% solution of China-wood oil in a petroleum distillate and then, after drying a brief period at 250 degrees F., dipping in a low boiling petroleum distillate containing 3% of a mixture of 90% of the chlorine-containing rubber derivative and 10% of paraffin. This film after drying ½ minute at 190 degrees F. was found to be not only moisture-proof but water-resistant, and remained for weeks in water without separation of either coating. It was both waterproof and moisture-proof.

The priming layer may be exceedingly thin. The layer of China-wood oil prepared on the film as above described is probably no more than about 50 molecules thick. When covered with the rubber derivative its odor is not perceptible. The thickness of the priming layer may be varied considerably and it may be applied by spraying or brushing or in any suitable way. Similarly the moisture-proof coating may be applied as a spray or by brushing or in any suitable way, and layers of various thicknesses may be utilized in accomplishing the result desired. A thin layer such as that prepared by dipping and draining as above described will give a coating satisfactory for ordinary purposes.

Although the invention relates more particularly to water-proofing sheets of regenerated cellulose, it may likewise be employed to water-proof filaments or objects of other shapes. Soluble dyestuffs, such as oil-soluble colors, may be added to the rubber derivatives to give any desired coloring.

Rubber derivatives suitable for use in coating the primed regenerated cellulose may be made in a number of ways. For example, to prepare a chlorine-containing derivative, such as used in the above sample, a 10% solution of plasticized pale crepe rubber is heated to near the boiling point and then 10% of chlorostannic acid ($H_2SnCl_6.6H_2O$) is added and the solution heated at or near the boiling point with stirring for several hours. The properties of the rubber derivative finally obtained will depend upon the length of time the reaction mixture is heated. A rubber derivative with a softening point of 70 degrees C. will be satisfactory for the purposes of this invention. After heating the reaction mixture of the rubber and the chlorostannic acid for the required length of time, it is poured into a large volume of water to form an emulsion. About 2½ gallons of water for each gallon of the reacted rubber cement will be satisfactory. The water is agitated and steam is introduced to volatilize the solvent. The rubber derivative is thus precipitated in a finely divided form. A study of this compound shows that the molecular groupings contained in it are larger than those in normal rubber and it is properly termed a condensation derivative of rubber. It contains a small percentage of bound chlorine.

A solution of this rubber derivative in a low boiling solvent such as a petroleum distillate may be used in forming the water-proof products of this invention, although a more moisture-proof product is obtained by adding to the rubber derivative a wax such as paraffin, ceresin, bees wax, etc.

A similar process for preparing a suitable condensation derivative of rubber employs a mixture of hydrochloric acid and a compound such as tin tetrachloride or other halide of an amphoteric metal, such as titanium chloride or chromic chloride, etc., instead of chlorostannic acid. If a mixture of hydrochloric acid and tin tetrachloride is employed, the acid should be added to the rubber cement and the mixture should be boiled a short time before adding the metallic halide. The ratio of the hydrochloric acid to the metallic halide may be varied somewhat from that in which these compounds are present in chorostannic acid.

A different condensation derivative of rubber, also satisfactory for use in this process, may be prepared by boiling a 10% solution of rubber in benzene for two or three hours, adding stannic chloride and continuing the heating, and then pouring into water and steam-distilling as described in connection with the above example. The product thus obtained is free from chlorine and is apparently composed entirely of hydrogen and carbon. Instead of using tin tetrachloride, other metallic halides such as titanium chloride and chromic chloride, etc., may be employed.

These condensation derivatives of rubber are mentioned as typical of the rubber derivatives which may be employed. Other condensation derivatives which may contain bromine, iodine or other elements may be employed.

In preparing the rubber derivative it is not necessary to pour the reacted cement into a large volume of water and steam distill as described, as the rubber derivative may be prepared by treating the reacted cement with a smaller amount of water or other compounds such as alcohol or acetone. However, where a colorless film is desired it is preferable to carry out the reaction as above described. Other condensation reagents than those mentioned may be employed.

Moisture-proofing compositions which comprise condensation derivatives of rubber are disclosed more particularly and claimed in my copending application, Serial No. 723,801, filed May 3, 1934.

In the description and claims the word "condensation" is used as defined by Cohen in Organic Chemistry for Advanced Students, Longmans Green & Company (New York, 1909), volume 1, page 245: "Condensation may, then be defined as the union of two or more organic molecules or parts of the same molecule, with or without elimination of component elements, in which the new combination is effected between carbon atoms."

What I claim is:

1. Regenerated cellulose, a moisture-proof coating composed essentially of wax and a condensation derivative of rubber obtainable by treating rubber with the halide of an amphoteric metal or chlorostannic acid, and between the coating and the regenerated cellulose a water-resistant bonding layer composed essentially of a drying oil.

2. Regenerated cellulose coated with an outside moisture-proof coating of a condensation derivative of rubber obtainable by treating rubber with the halide of an amphoteric metal or chlorostannic acid, and a dried China-wood oil bonding layer between the rubber derivative and the regenerated cellulose.

3. Regenerated cellulose coated with a moisture-proofing composition which comprises a condensation derivative of rubber obtainable by treating rubber with the halide of an amphoteric metal or chlorostannic acid and an intermediate bonding layer composed essentially of a drying oil.

4. The method of treating regenerated cellulose which comprises applying thereto a drying oil, drying the oil, and then covering with a moisture-proof coating which comprises a condensation derivative of rubber obtainable by treating rubber with the halide of an amphoteric metal or chlorostannic acid.

5. The method of treating regenerated cellulose which comprises coating it with a drying oil, and then, after oxidation of the oil, covering with a moisture-proof coating of a condensation derivative of rubber obtainable by treating rubber with the halide of an amphoteric metal or chlorostannic acid.

6. The method of water-proofing a sheet of regenerated cellulose which comprises applying a solution of China-wood oil in a volatile solvent and, after oxidation of the oil, applying a moisture-proofing composition dissolved in a volatile solvent, which moisture-proofing composition comprises wax and a condensation derivative of rubber obtainable by treating rubber with the halide of an amphoteric metal or chlorostannic acid.

SAMUEL D. GEHMAN.